(12) United States Patent
Phlegm et al.

(10) Patent No.: US 11,398,653 B2
(45) Date of Patent: Jul. 26, 2022

(54) CURE-IN-PLACE LIGHTWEIGHT THERMALLY-CONDUCTIVE INTERFACE

(71) Applicant: GM Global Technology Operations LLC, Detroit, MI (US)

(72) Inventors: Herman K. Phlegm, West Bloomfield, MI (US); Mahmoud Abd Elhamid, Troy, MI (US); Timothy J. Fuller, Pittsford, NY (US); Mark O. Vann, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 16/196,431

(22) Filed: Nov. 20, 2018

(65) Prior Publication Data

US 2020/0161727 A1 May 21, 2020

(51) Int. Cl.
*H01M 10/653* (2014.01)
*H01M 10/6551* (2014.01)
*H01M 10/625* (2014.01)
*H01M 10/613* (2014.01)
*F28F 21/02* (2006.01)
(Continued)

(52) U.S. Cl.
CPC ........... *H01M 10/653* (2015.04); *F28F 21/02* (2013.01); *F28F 21/089* (2013.01); *F28F 23/00* (2013.01); *H01M 10/613* (2015.04); *H01M 10/625* (2015.04); *H01M 10/6551* (2015.04); *B60K 6/28* (2013.01); *B60L 50/64* (2019.02); *B60L 58/26* (2019.02); *B60Y 2200/91* (2013.01); *B60Y 2200/92* (2013.01); *B60Y 2400/112* (2013.01); *H01M 2220/20* (2013.01)

(58) Field of Classification Search
CPC ............. H01M 10/613; H01M 10/625; H01M 10/653; H01M 10/6551; H01M 10/6554; H01M 10/6555; H01M 2220/20; H01M 50/20
See application file for complete search history.

(56) References Cited

U.S. PATENT DOCUMENTS

| | | | |
|---|---|---|---|
| 2007/0037053 A1* | 2/2007 | Anantharaman | H01M 50/10 429/176 |
| 2011/0192564 A1* | 8/2011 | Mommer | H01M 10/658 165/10 |

(Continued)

FOREIGN PATENT DOCUMENTS

| | | |
|---|---|---|
| CN | 102349151 A | 2/2012 |
| CN | 107760278 A | 3/2018 |
| WO | 2018164671 A1 | 9/2018 |

*Primary Examiner* — Carlos Barcena
(74) *Attorney, Agent, or Firm* — Quinn IP Law

(57) ABSTRACT

A thermal interface member configured to be disposed between a heat sink and a heat-releasing device includes a thermal interface member. The thermal interface member has a thermally conductive, cure-in-place, polymer foam pad configured to maintain uniform contact with each of the heat sink and the heat-releasing device. The thermal interface member is additionally configured to absorb the thermal energy released by the heat-releasing device and direct the released thermal energy to the heat sink. The polymer foam pad has a matrix structure including at least one of anisotropic and isotropic thermally conductive anisotropic filler material, and is characterized by foam material density below 0.5 g/cm$^3$.

21 Claims, 6 Drawing Sheets

(51) Int. Cl.
*F28F 21/08* (2006.01)
*F28F 23/00* (2006.01)
*B60K 6/28* (2007.10)
*B60L 58/26* (2019.01)
*B60L 50/64* (2019.01)

(56) References Cited

U.S. PATENT DOCUMENTS

| | | | |
|---|---|---|---|
| 2013/0130086 A1* | 5/2013 | Schaefer | H01M 10/6555 429/120 |
| 2014/0113171 A1* | 4/2014 | Schaefer | H01M 10/625 429/120 |
| 2014/0154539 A1* | 6/2014 | Kwok | H01M 10/643 429/82 |
| 2017/0200995 A1 | 7/2017 | Phlegm et al. | |

\* cited by examiner

CURE-IN-PLACE LIGHTWEIGHT THERMALLY-CONDUCTIVE INTERFACE

INTRODUCTION

The disclosure relates to a cure-in-place, lightweight, thermally conductive, interface between a thermal energy source and adjacent structures.

Various electric and electronic devices, such as energy storage cells, control modules, electric motors, computers, etc., release waste heat as a byproduct of their primary operation.

Energy storage cells, e.g., batteries, may be broadly classified into primary and secondary energy storage units. Primary energy storage cells, for example, disposable batteries, are intended to be used until depleted, after which they are simply replaced with one or more new energy storage cells. Secondary energy storage cells, for example, rechargeable batteries, are capable of being repeatedly recharged and reused, therefore offering economic, environmental and ease-of-use benefits compared to disposable energy storage units. Both primary and secondary energy storage cells may be interconnected and organized into energy storage cell packs to deliver desired voltage, capacity, or power density.

Secondary cells, such as lithium-ion batteries, tend to be more prone to thermal runaway, or uncontrolled rise in internal temperature, than primary cells. Specifically, thermal runaway occurs when the internal reaction rate increases until more heat is being generated than may be withdrawn, leading to a further increase in both reaction rate and heat generation. Eventually, the amount of generated heat may be great enough to lead to loss of the cell's utility as well as damage to materials in proximity to the cell. Thermal runaway in a secondary energy storage cell may be initiated by a short circuit within the cell, improper cell use, physical abuse, manufacturing defects, or exposure of the cell to extreme external temperatures.

During a thermal runaway event, a large amount of thermal energy is rapidly released, heating the entire cell up to a temperature of 900° C., or greater. Due to the increased temperature of the cell undergoing thermal runaway, the temperature of adjacent cells within the cell pack will typically also increase. If the temperature of adjacent cells is permitted to increase unimpeded, such cells may also enter into a state of thermal runaway—leading to a cascading effect, where the initiation of thermal runaway within a single cell propagates throughout the entire storage cell pack. As a result, power from the cell pack may be interrupted, while a system employing the cell pack may incur collateral damage due to the scale of thermal runaway and the associated release of thermal energy.

SUMMARY

A thermal interface member configured to be disposed between a heat sink and a heat-releasing device includes a thermal interface member. The thermal interface member has a thermally conductive, cure-in-place, polymer foam pad configured to maintain uniform contact with each of the heat sink and the heat-releasing device. The thermal interface member is additionally configured to absorb the thermal energy released by the heat-releasing device and direct the released thermal energy to the heat sink. The polymer foam pad has a matrix structure including at least one of anisotropic and isotropic thermally conductive filler material, and is characterized by foam material density below 0.5 g/cm$^3$.

The thermal interface member may include an anisotropic, thermally conductive layer configured to direct the thermal energy released by the heat-releasing device to the heat sink.

The thermally conductive layer may be anisotropic and include at least one of boron nitride, graphite, and graphene.

The thermally conductive layer may be isotropic and include at least one of aluminum nitride, silicon carbide, aluminum oxide, zinc oxide, metallic powders, and synthetic diamond.

The polymer foam pad may include a heat-resistant, thermoset polymer, having at least one of silicone, acrylic, polyurethane, polyvinylester, polycycloolefin, polyolefin, and polystyrene.

The matrix structure of the polymer foam pad may have an open-cell or a closed-cell foam construction. Furthermore, the closed-cell foam construction may include a foaming agent configured as microcapsules.

The polymer foam pad may be electrically conductive and the thermal interface member may additionally include an electrical isolation layer.

The electrical isolation layer may be configured as a polyethylene terephthalate (PET) film.

The polymer foam pad may be electrically nonconductive and be characterized by absence of an electrical isolation member.

Another embodiment of the present disclosure is directed to an energy storage system. The energy storage system includes an energy storage cell pack having a first cell and a second cell disposed adjacent the first cell, wherein each of the first and second cells is configured to generate and store electrical energy through thermal energy generating or releasing electro-chemical reactions. The energy storage system also includes a heat sink configured to accept and dissipate the thermal energy released by the first and second cells. The energy storage system additionally includes a first thermal interface member, such as the thermal interface member specifically described above. The first thermal interface member is disposed between the first cell and the second cell, and includes a first thermally conductive, cure-in-place, polymer foam pad. The first thermal interface member is configured to maintain uniform contact with each of the first and second cells during alternate expansion of the first and second cells when charging and contraction of the first and second cells when discharging and absorb the thermal energy released by the first and second cells and direct the thermal energy to the heat sink.

The first thermal interface member may include an anisotropic, thermally conductive layer disposed between the first polymer foam pad and at least one of the first cell and the second cell. In such an embodiment, the thermally conductive layer is configured to direct the thermal energy released by the at least one of the first cell and the second cell to the heat sink. The anisotropic, thermally conductive layer may be a coating applied directly to the first polymer foam pad.

The anisotropic, thermally conductive layer may include boron nitride, graphite, or graphene.

The energy storage system may also include a second thermal interface member having a second thermally conductive, cure-in-place, polymer foam pad disposed orthogonal to the first polymer foam pad between the heat sink and the energy storage cell pack. The second polymer foam pad is configured to couple the heat sink to the first polymer foam pad.

Each of the first polymer foam pad and the second polymer foam pad may have a matrix structure including a thermally conductive anisotropic and/or isotropic filler material, such as boron nitride, graphite, and graphene, and be characterized by foam material density below 0.5 g/cm³.

The second thermal interface member may be configured to couple the heat sink to the first thermal interface member and to operate as a thermal interface therebetween.

The energy storage system additionally includes a cold plate, such as a fin, extending adjacent at least one of the first cell and the second cell. In such an embodiment, the second thermal interface member is configured to couple the heat sink to the cold plate and operate as a thermal interface therebetween.

At least one of the first polymer foam pad and the second polymer foam pad may be electrically conductive. The respective at least one of the first thermal interface member and second thermal interface member may additionally include an electrical isolation layer configured to limit loss of electrical energy from the energy storage cell pack.

The electrical isolation layer may be configured as a polyethylene terephthalate (PET) film.

At least one of the first polymer foam pad and the second polymer foam pad may be electrically nonconductive. In such an embodiment, the respective at least one of the first polymer foam pad and the second polymer foam pad may be characterized by an absence of electrical isolation at the respective first polymer foam pad and the second polymer foam pad.

Yet another embodiment of the present disclosure is directed to a vehicle employing a powerplant which uses electrical energy produced by such an energy storage system to generate torque.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
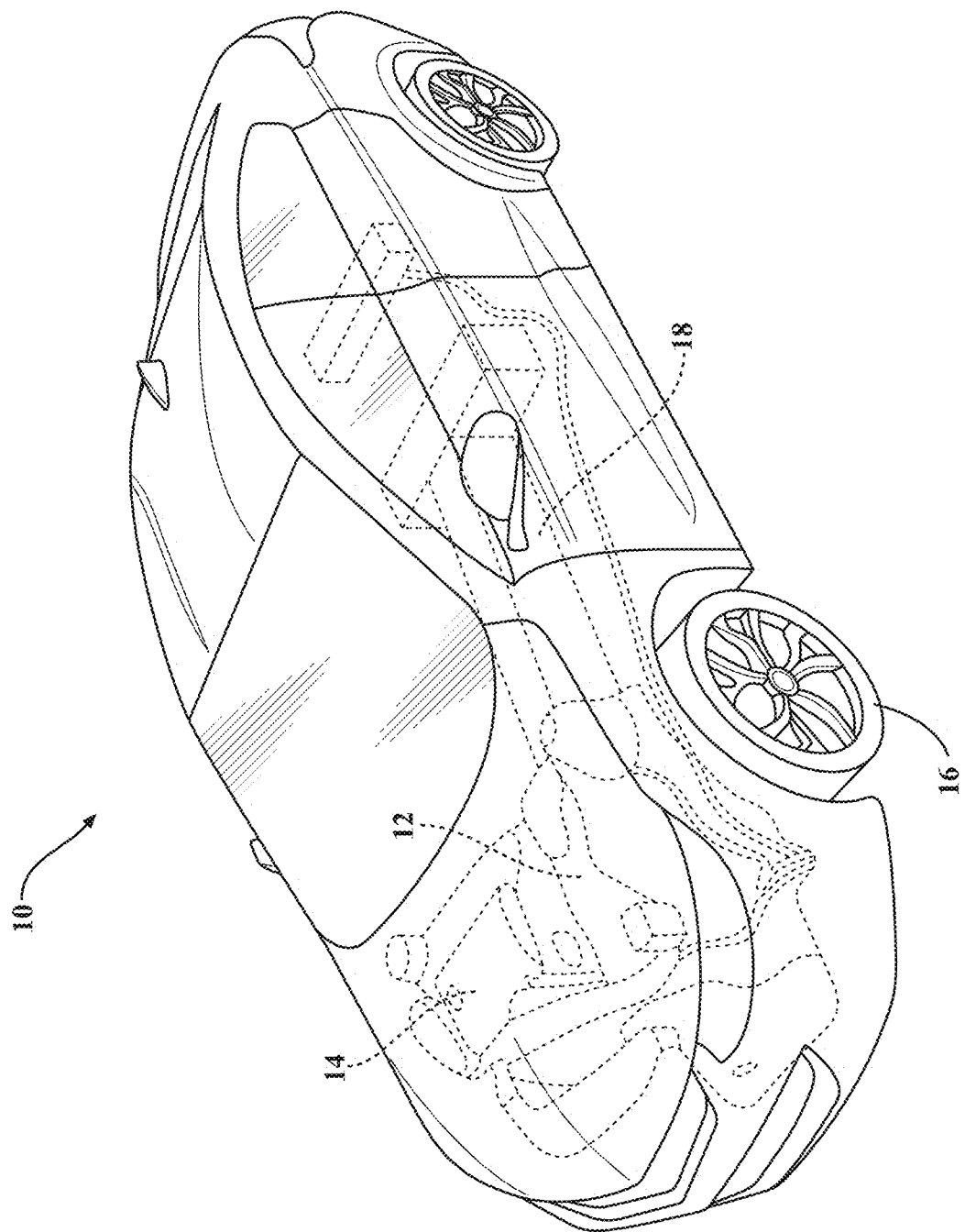
FIG. 1 is a schematic illustration of a vehicle employing a hybrid powertrain and an energy storage system configured to provide electrical energy thereto, according to the disclosure.

Referring to the drawings, FIG. 1 illustrates a vehicle 10. It should be understood that identical element symbols used on multiple figures refer to the same component, or components of equal functionality. Additionally, the accompanying figures are only meant to illustrate, not limit, the scope of the disclosure, and should not be considered to be to scale. The vehicle 10 may be, but is not be limited to, a commercial vehicle, industrial vehicle, passenger vehicle, train or the like. As shown, the vehicle 10 may be an electric or a hybrid-electric vehicle having one or more power-sources or powerplants to provide vehicle propulsion. Specifically, the vehicle 10 may have a first powerplant 12, such as an electric motor, and a second powerplant 14, such as an internal combustion engine, configured to generate respective drive torques to drive the vehicle via wheels 16.

Figure 2:
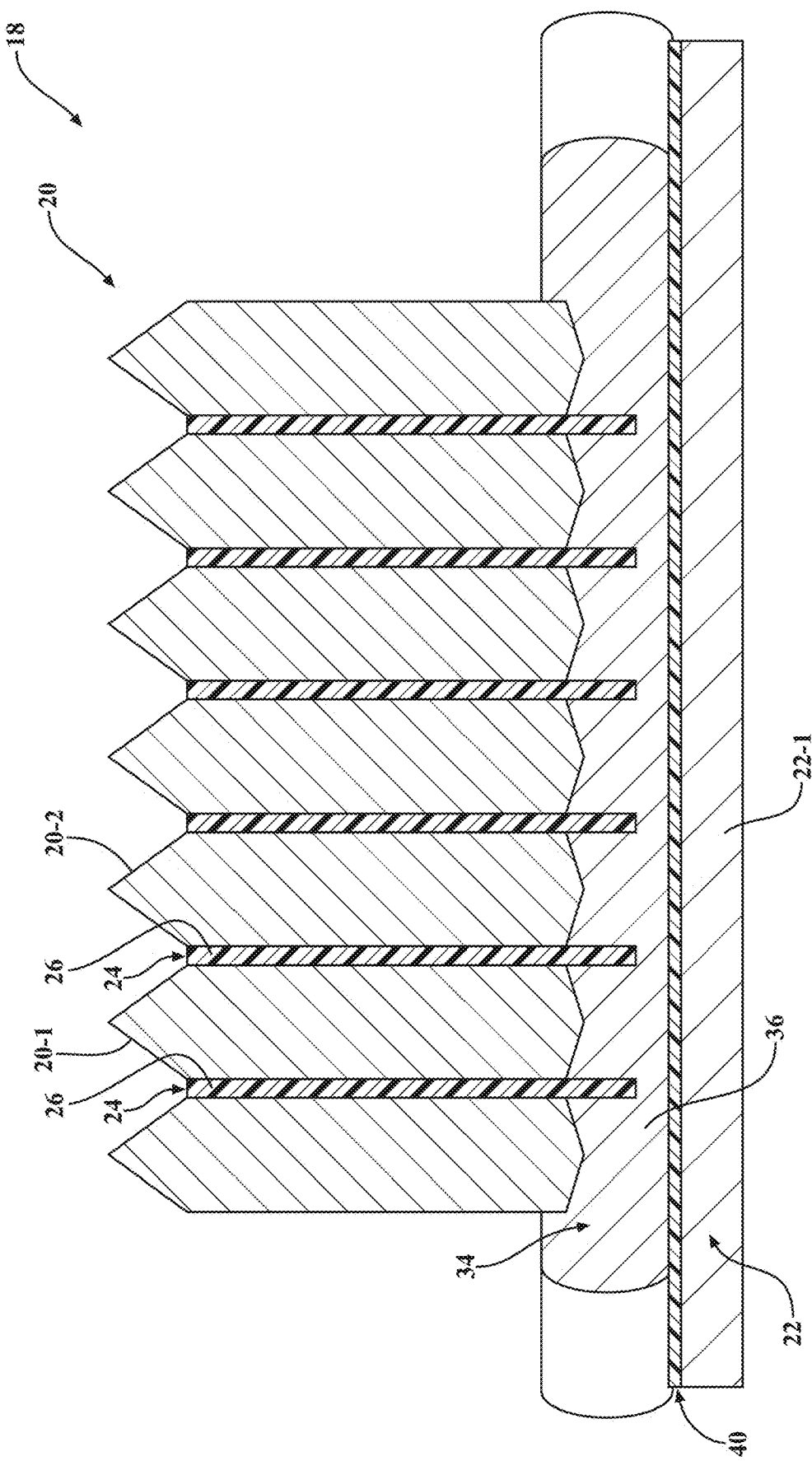
FIG. 2 is a schematic close-up cross-sectional plan view of one embodiment of the energy storage system shown in FIG. 1, wherein the energy storage system includes a storage cell pack having a plurality of cells and thermal interface members having thermally conductive, cure-in-place, polymer foam pads.

The vehicle 10 additionally includes an energy storage system 18 configured to provide electrical energy to each of the first powerplant 12 and the second powerplant 14 to facilitate generation of the respective drive torques. As shown in FIG. 2, the energy storage system 18 includes a heat-releasing device, specifically an energy storage cell pack 20, such as a battery pack. The energy storage cell pack 20 includes adjacent first cell 20-1 and second cell 20-2. Each of the first and second cells 20-1, 20-2 is configured to generate and store electrical energy through thermal energy generating or releasing electro-chemical reactions. Although the energy storage cell pack 20 is specifically shown as having first and second cells 20-1, 20-2, the energy storage cell pack may include various multiples of energy storage cells.

In the following description, the terms "energy storage cell", "battery", "cell", and "battery cell" may be used interchangeably and may refer to a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack", as used herein, refers to multiple individual batteries contained within a single piece or multi-piece housing, the individual batteries electrically interconnected to achieve the desired voltage and capacity for a particular application. Additionally, the storage cell pack 20 is represented schematically, and, therefore, not all battery elements and/or battery pack elements are shown in the illustrations.

The energy storage system 18 is configured to maintain consistent dissipation of thermal energy emitted or released by the first cell 20-1 and the second cell 20-2 during generally typical charging and discharging of the cells. The energy storage system 18 is also intended to facilitate effective dissipation of thermal energy under less typical, e.g., abusive, operating conditions, and limit the possibility of a thermal runaway in the energy storage cell pack 20. The energy storage system 18 is specifically configured to accomplish the above task via one or more lightweight, thermally conductive interfaces disposed between individual cells, e.g., 20-1, 20-2, and relative to adjacent structures, to be discussed in detail below.

A variety of different abusive operating/charging conditions and/or manufacturing defects may cause a battery, such as those in battery pack 20, to enter into thermal runaway, where the amount of internally generated heat is greater than that which may be effectively withdrawn. As a result, a large amount of thermal energy is rapidly released, heating the entire cell up to a temperature of 900° C. or greater, and causing the formation of localized hot spots where the temperature may exceed 1500° C. Once a cell, for example the cell 20-1, begins to undergo thermal runaway, the thermal energy generated during this event may heat the adjacent cells, such as the cell 20-2, to above their critical temperature, causing them to enter into thermal runaway. These adjacent cells, in turn, may heat additional cells to a sufficient temperature to cause them to enter into thermal runaway. Thus, the occurrence of a single cell undergoing thermal runaway may initiate a cascading reaction that may spread throughout the entire energy storage cell pack 20.

Although the specification concentrates on the energy storage system 18, other systems that are capable of rapidly releasing significant amounts of thermal energy are also considered to be within the scope of the present disclosure. Such systems may, for example, include consumer electronics, such as telephones and personal computers, as well as other systems that include heat-releasing devices and which may use heat sinks for managing such release of thermal energy. Accordingly, while the following description focuses on applications of the structures described below to the energy storage system 18, applications to such other systems using heat-releasing devices are also envisioned.

With continued reference to FIG. 2, the energy storage system 18 also includes a heat sink 22, such as a coolant plate or reservoir configured to accept and dissipate the thermal energy produced by the first and second cells 20-1, 20-2. The heat sink 22 may include a coolant loop 22-1 employing coolant circulation tubes. The energy storage system 18 also includes a first thermal interface member 24 disposed between the first cell 20-1 and the second cell 20-2. The first thermal interface member 24 includes a first thermally conductive, cure-in-place, polymer foam pad 26 (shown in FIGS. 3-6). The foam pad 26 is constructed by mixing a specific polymer with an appropriate foaming agent, each of which will be discussed in detail below. Thus generated, the material of the foam pad 26 has a short, in the range of 1-5 minutes, working time, and cures in place, i.e., solidifies and takes on its final shape after being injected or placed between the first and second cells 20-1, 20-2, within approximately 10-30 minutes. Accordingly, after curing, the injected material forms a solid, strong, flexible, and long-lasting foam pad 26. While curing in place, the material of the foam pad 26 is envisioned to have substantially 0% shrinkage. As used herein, the term "solid" would refer to a complete cross-linking of the liquid or gel such that a solid structure forms, and would indicate a fully cured foamed material. In specific embodiments, measure of cure is measured by sampling the material and testing on a nuclear magnetic resonance machine to give a degree of cure. Flow-ability can be performed before the material is cross linked with a dynamic mechanical analyzer. As indicated above, other systems that are capable of rapidly releasing significant amounts of thermal energy and utilize a heat sink component, such as the heat sink 22, are also envisioned.

Figure 3:
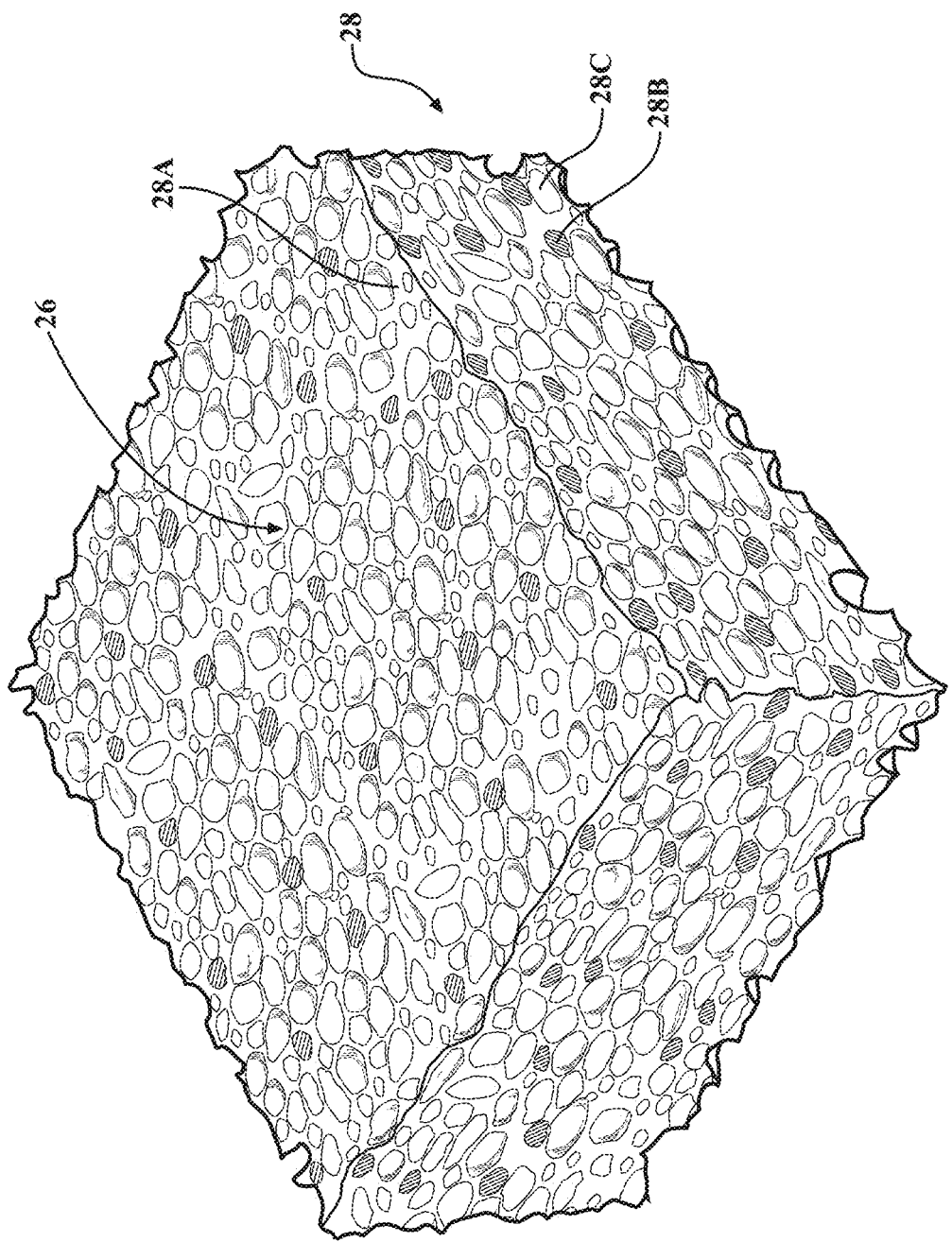
FIG. 3 is a schematic close-up perspective view of a respective polymer foam pad having a matrix structure.
Figures 4A, 4B:
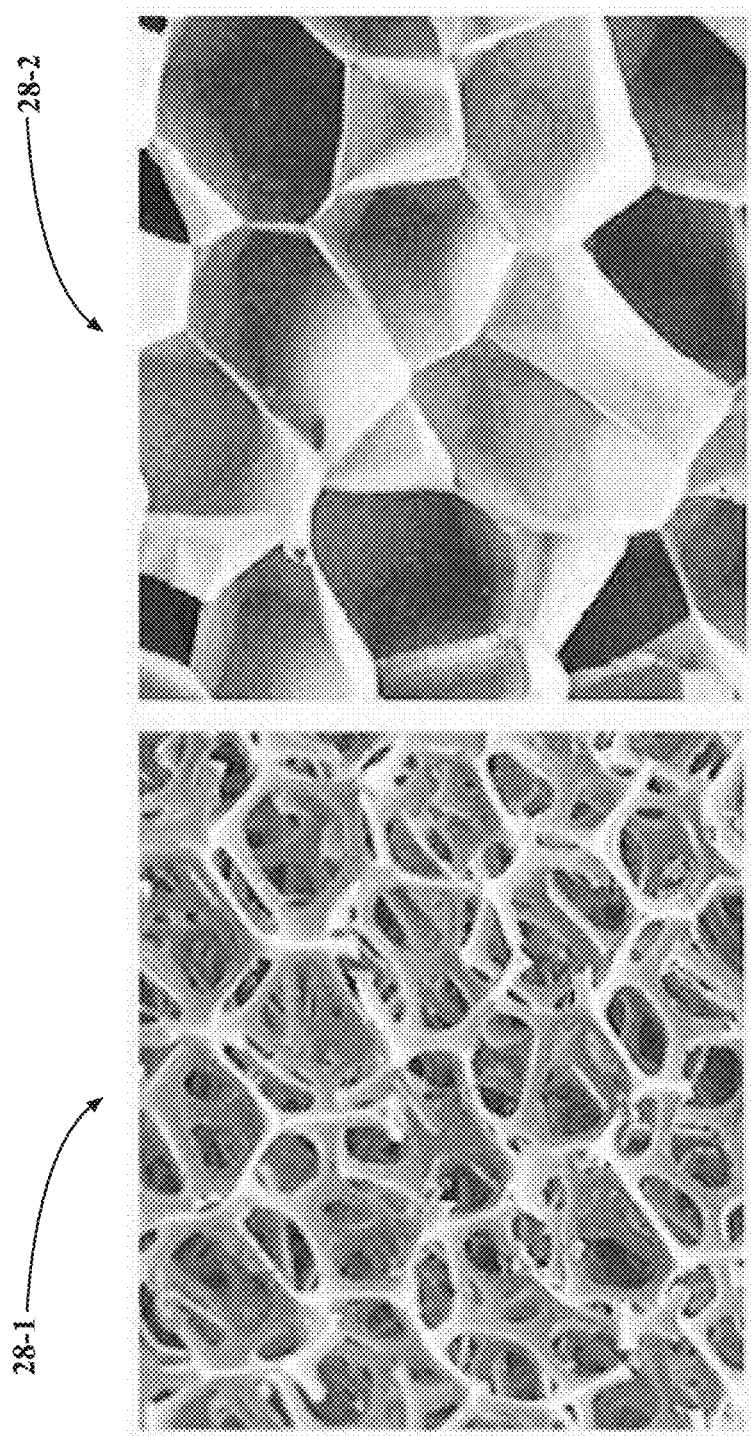
FIG. 4A is a close-up detail view of a respective polymer foam pad having an open-cell matrix structure.
FIG. 4B is a close-up detail view of a respective polymer foam pad having a closed-cell matrix structure.
Figure 5:
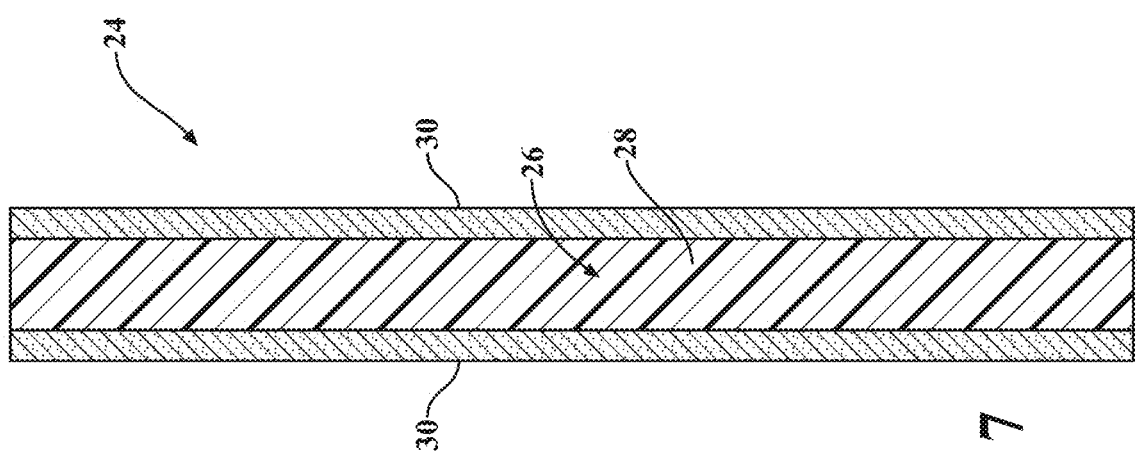
FIG. 5 is a schematic close-up cross-sectional plan view of a specific embodiment of an electrically conductive heat-resistant matrix structure of a respective polymer foam pad.

As specifically shown in FIGS. 3-5, the first polymer foam pad 26 has a heat-resistant porous matrix structure 28. As shown in FIG. 3, the heat-resistant porous matrix structure 28 may include a conformable, lightweight, base material 28A, with thermally conductive, anisotropic and/or isotropic fillers 28B and voids or pores 28C. The cured lightweight, porous matrix structure of the first polymer foam pad 26 is configured to limit propagation of thermal energy between the first and second cells 20-1, 20-2, and facilitate transfer of the waste heat from the storage cell pack 20 to the heat sink 22. Specifically, the first polymer foam pad 26 is configured to maintain direct, consistent, and uniform contact with the first cell 20-1 and the second cell 20-2 during alternate expansion of the cells 20-1, 20-2 when charging and contraction of the cells when discharging. Additionally, the first polymer foam pad 26 is configured to absorb the thermal energy released by the first and second cells 20-1, 20-2 and direct the thermal energy to the heat sink 22.

As discussed above, the base material 28A of the first polymer foam pad 26 forms the heat-resistant matrix 28 and is infused with thermally conductive, anisotropic and/or isotropic fillers 28B. In general, an "anisotropic" material has properties that are directionally dependent, or distinct in different directions, as opposed to an "isotropic" material, which has direction-independent properties. As specifically employed herein, "anisotropic" denotes the material of the heat-resistant matrix 28 having thermal conductivity that is directionally dependent, i.e., dissimilar when measured along different axes. The difference in a material's physical or mechanical properties, e.g., thermal conductivity of the first polymer foam pad 26, maybe identified when measured along different axes X and Y. In the case of the first polymer foam pad 26, material anisotropic characteristics may be used to advantageously establish direction of the subject pad's thermal conductivity. For example, the thermal conductivity of the first polymer foam pad 26 in the X-Y plane may be greater along the Y axis, as compared with the thermal conductivity along the X axis (shown in FIG. 5), for most effective dissipation of thermal energy from the storage cell pack 20 to the heat sink 22 via the first thermal interface member 24.

The base materials 28A of the matrix 28 may be selected from a list of heat-resistant, thermoset polymers, including, but not limited to, silicone, acrylic, polyurethane, polyvinylester, poly(cycloolefins, e.g., polyoctenamer such as Vestenamer 8012 or 6213), polyolefins (e.g., polybutadienes, poly(1-olefins), and polystyrene. The fillers may be selected from a list of anisotropic materials, including, but not limited to, boron nitride, graphite, and graphene, and/or from a list of isotropic fillers including, but not limited to, aluminum nitride, silicon carbide, aluminum oxide, zinc oxide, metallic powders, synthetic diamond, or mixtures thereof. Each of the contemplated fillers are either thermally conductive by themselves or as admixtures thereof. Each of the base materials 28A may be employed to form the fundamental structure of the polymer foam pad 26 with the addition of the previously noted foaming agent. The foaming agent may be an inert gas, such as nitrogen, argon, or air.

The required thermal conductivity of the foam pad 26 may be achieved either via an open-cell foam structure 28-1 (shown in FIG. 4A) or a closed-cell foam structure 28-2 (shown in FIG. 4B) of the matrix 28. The foaming agent may be introduced as hollow microcapsules into the closed-cell foam structure 28-2 of the matrix 28. Such hollow microcapsules may be either pre-expanded or as heat-activated expanding microcapsules blended with the filler material and with the heat resistant polymers. The microcapsules may, for example, be formed from polyvinylidene chloride-polyacrylonitrile. The microcapsules may be employed in either expanded or unexpanded form. Depending on the specific foaming agent, expanded microcapsules may come in different ranges of sizes or diameters, for example 33-55, 30-50, 55-85, or 30-50 microns. Similarly, various foaming agent unexpanded microcapsules may also come in different ranges of sizes, for example 10-16, 9-15, 18-14, or 28-38 microns. Unexpanded microcapsules may be activated to expand at temperatures from approximately 80 to 190 degrees Celsius, depending on the foaming agent.

The first polymer foam pad 26 may have foam material density below 0.5 $g/cm^3$, and further below 0.3 $g/cm^3$ More specifically, the first polymer foam pad 26 material density maybe in the range of 0.1-0.2 $g/cm^3$, thus facilitating the lightweight structure of the first thermal interface member 24 (shown in FIG. 7). With respect to the exemplary base materials 28A of the matrix, silicones are generally polymers that include an inert, synthetic compound made up of repeating units of siloxane, which is a chain of alternating silicon atoms and oxygen atoms, combined with carbon, hydrogen, and sometimes other elements. Expanding foam-forming silicones are typically heat-resistant and electrically non-conductive. Expanded graphite, in particular, interferes with the foaming of a two-part silicone, such as Elastocil. Accordingly, in such an embodiment microcapsules may be used to construct a closed-cell foam pad 26.

Acrylic elastomers generally belong to a group of polymers which are generally referred to as plastics. Acrylic elastomers are noted for their transparency, resistance to breakage, and elasticity. Acrylic elastomers have characteristics of heat and chemical resistance.

Generally, polyurethane is a polymer composed of organic units joined by carbamate (urethane) links. While most polyurethanes are thermosetting polymers that are thermally stable, i.e., do not melt when heated, thermoplastic polyurethanes are also available.

Typically, polyvinylesters or vinyl polymers are a group of polymers derived from vinyl monomers. An ester is a chemical compound derived from an organic or inorganic acid. In general, esters are derived from a carboxylic acid and an alcohol. Commonly, polyvinylesters are thermally stable and electrically non-conductive.

A polystyrene is generally a synthetic aromatic hydrocarbon polymer made from the monomer styrene. Polystyrene may be solid or foamed, and is electrically non-conductive.

In general, boron nitride is a heat and chemically resistant refractory compound of boron and nitrogen with the chemical formula BN. Boron nitride exists in various crystalline forms that are isoelectronic to a similarly structured carbon lattice. The cubic (sphalerite structure) variety analogous to diamond is called c-BN; it is softer than diamond, but its thermal and chemical stability is greater.

Generally, graphite is a crystalline allotrope of carbon, a semimetal, a native element mineral, and a form of coal. Graphite is the most stable form of carbon under standard conditions. Graphite has a layered, planar structure. The individual layers are called graphene. In each layer, the carbon atoms are arranged in a honeycomb lattice. Atoms in the plane are bonded covalently, with only three of the four potential bonding sites satisfied. The fourth electron is free to migrate in the plane, making graphite electrically conductive. However, graphite does not conduct electricity in a direction at right angles to the respective plane. Other forms of carbon may also be used as functional thermal conducting materials, including carbon nanofibers and nanotubes.

Figure 7:
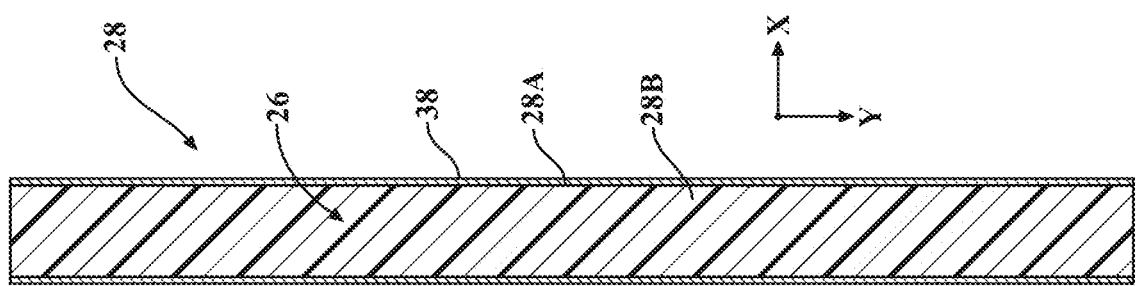
FIG. 7 is a schematic close-up cross-sectional plan view of a specific thermal interface member having an anisotropic and/or isotropic thermally conductive layer.

As shown in FIG. 7, the first thermal interface member 24 may also include an anisotropic and/or isotropic, thermally conductive layer 30 disposed between the first polymer foam pad 26 and at least one of the first cell 20-1 and the second cell 20-2. The layer 30 is configured to direct the thermal energy released by the first cell 20-1 and/or the second cell 20-2 to the heat sink 22 (shown in FIGS. 2 and 7). The layer 30 may be a coating or a film applied directly to the first polymer foam pad 26. The layer 30 may include or be formulated from anisotropic and/or isotropic, thermally conductive materials, including, but not limited to, boron nitride, graphite, and graphene, aluminum nitride, silicon carbide, aluminum oxide, zinc oxide, metallic powders, synthetic diamond, or mixtures thereof. Such an embodiment of the first thermal interface member 24 may be used as a primary heat transfer medium arranged between the first cell 20-1 and the second cell 20-2.

Figure 8:
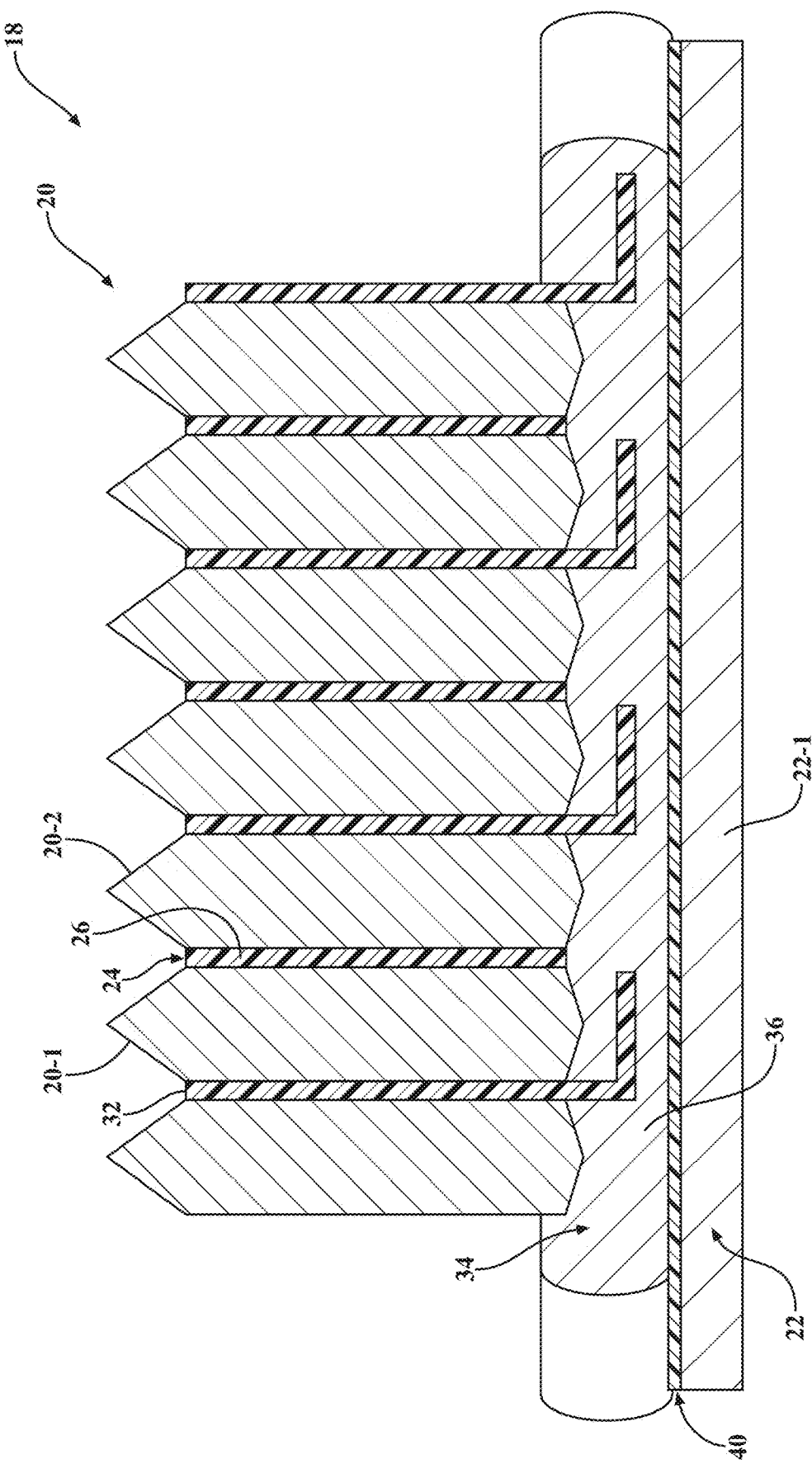
FIG. 8 is a schematic close-up cross-sectional plan view of another embodiment of the energy storage system shown in FIG. 1 having a storage cell pack having a plurality of cells, thermal interface members, and a cold plate extending adjacent some of the cells.

With reference to FIG. 8, the energy storage system 18 may also include a cold plate or fin 32 extending along and adjacent at least one of the first cell 20-1 and the second cell 20-2 as another heat transfer medium. As shown in FIG. 8, in an energy storage cell pack 20 having greater than the two subject cells 20-1, 20-2, cold plates 32 may be positioned between respective pairs of cells, and thus alternate with the first thermal interface members 24 in such a cell pack. In such an embodiment, each cell 20-1, 20-2 will be in contact with one first thermal interface member 24 and one cold plate 32. With reference to each of FIGS. 2 and 7, the energy storage system 18 may additionally include a second thermal interface member 34. The second thermal interface member 34 is intended to include a second thermally conductive, cure-in-place, polymer foam pad 36.

As shown, the second polymer foam pad 36 is disposed orthogonal to the first polymer foam pad 26 between the heat sink 22 and the energy storage cell pack 20. The second polymer foam pad 36 is configured to couple the heat sink 22 to the first polymer foam pad 26 and operate as a thermal interface therebetween. In the embodiment of the energy storage system 18 having the cold plate 32, the cold plate is in direct contact with the second polymer foam pad 36. As such, the second thermal interface member 34 may be additionally configured to couple the heat sink 22 to the cold plate 32 and operate as a thermal interface therebetween.

Similar to the first polymer foam pad 26, the second polymer foam pad 36 may be constructed as a heat-resistant matrix 28 from a conformable, lightweight, base material 28A with thermally conductive, anisotropic and/or isotropic, thermally conductive fillers 28B, as shown in FIGS. 3 and 4. Anisotropic and/or isotropic, thermally conductive material characteristics of the second polymer foam pad 36 (shown in FIG. 8) may be used to advantageously establish direction of the second pad's thermal conductivity for most effective dissipation of thermal energy from the first thermal interface member 24 to the heat sink 22 via the second thermal interface member 34. Similar to the first polymer foam pad 26, the second polymer foam pad 36 (shown in FIG. 8) may have foam material density below 0.5 $g/cm^3$. More specifically, the second polymer foam pad 36 material density may be in the range of 0.1-0.2 $g/cm^3$, thus facilitating the lightweight structure of the second thermal interface member 34.

The heat-resistant matrix 28 of each of the first polymer foam pad 26 and the second polymer foam pad 36 may be electrically conductive. In the embodiment of the electrically conductive first polymer foam pad 26, the first thermal interface member 24 is additionally envisioned to include an electrical isolation layer or member 38 (shown in FIG. 5). The electrical isolation layer 38 is configured to limit loss of electrical energy from the energy storage cell pack 20 to the environment through the first polymer foam pad 26. As shown, one example of the electrical isolation layer 38 may be disposed between the first polymer foam pad 26 and the first cell 20-1, and another example of the electrical isolation layer 38 may be disposed between the first polymer foam pad and the second cell 20-2.

In the embodiment of the electrically conductive second polymer foam pad 36, shown in FIGS. 2 and 7, the second thermal interface member 34 additionally includes an electrical isolation layer 40. Similar to the electrical isolation layer 38 shown in FIG. 5, the electrical isolation layer 40 is configured to limit loss of electrical energy from the energy storage cell pack 20 to the environment. Specifically, the electrical isolation layer 40 is configured to limit loss of electrical energy from the energy storage cell pack 20 through the second polymer foam pad 36. As shown, the electrical isolation layer 38 may be disposed between the second polymer foam pad 36 and the first cell 20-1, and another example of the electrical isolation layer 38 may be disposed between the first polymer foam pad 26 and the heat sink 22. Each of the electrical isolation layers 38, 40 may be configured, for example, as a polyethylene terephthalate (PET) film.

Figure 6:
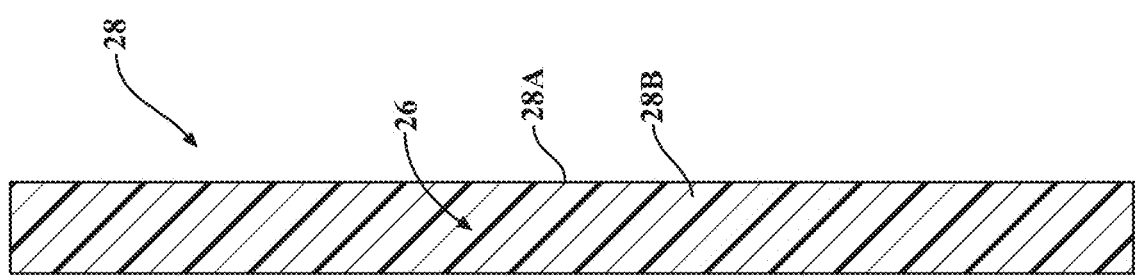
FIG. 6 is a schematic close-up cross-sectional plan view of an embodiment of an electrically non-conductive heat-resistant matrix structure of a respective polymer foam pad.

Alternatively, each of the first polymer foam pad 26, as shown in FIG. 6, and the analogous second polymer foam pad 36 (not shown) may be electrically nonconductive. In the embodiments of the electrically nonconductive first and second polymer foam pads 26, 36, each of the subject polymer foam pads is characterized by absence of an electrical isolation member, such as the isolation layer 40 shown in FIGS. 2 and 7. In other words, an electrically nonconductive first polymer foam pad 26 (and the analogous second polymer foam pad 36) does not require electrical isolation to limit loss of electrical energy from the energy storage cell pack 20 to the environment.

Generally, either one or both of the first and second thermal interface members 24, 34 may be utilized in the energy storage system 18, whether for propulsion of the vehicle 10 or for power generation in a different device. Additionally, one or both of the first and second thermal interface members 24, 34 may be used for removing, i.e., absorbing and redirecting, waste thermal energy emitted by various heat-releasing devices. With respect to the present disclosure, heat-releasing devices emitting thermal energy as a byproduct of their primary operation may be present in assemblies such as control modules, electric motors, computers, and other high resistance electrical and electronics applications.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An energy storage system, comprising:
    an energy storage cell pack including a first cell and a second cell disposed adjacent the first cell, wherein each of the first and second cells is configured to generate and store electrical energy through thermal energy releasing electro-chemical reactions;
    a heat sink arranged perpendicular to each of the first and second cells and configured to accept and dissipate the thermal energy released by the first and second cells; and
    a first thermal interface member arranged perpendicular to the heat sink, disposed between the first cell and the second cell, having a first thermally conductive, cure-in-place, polymer foam pad, and configured to:
        maintain uniform contact with the first cell and the second cell during alternate expansion of the first and second cells when charging and contraction of the first and second cells when discharging; and
        absorb the thermal energy released by the first and second cells and direct the thermal energy to the heat sink; and
    a second thermal interface member having a second thermally conductive, cure-in-place, polymer foam pad disposed orthogonal to the first polymer foam pad between the heat sink and the energy storage cell pack, and configured to couple the heat sink to the first polymer foam pad and operate as a thermal interface therebetween;
    wherein:
        material characteristics and arrangement of the first polymer foam pad establish direction of thermal conductivity of the first polymer foam pad to limit propagation of the thermal energy between the first cell and the second cell, via the first thermal interface member, and facilitate transfer of waste heat from the energy storage cell pack to the heat sink; and
        material characteristics and arrangement of the second polymer foam pad establish direction of thermal conductivity of the second polymer foam pad for effective dissipation of thermal energy, via the second thermal interface member, from the first thermal interface member to the heat sink.

2. The energy storage system of claim 1, wherein the first thermal interface member includes an anisotropic, thermally conductive layer disposed between the first polymer foam pad and at least one of the first cell and the second cell, and configured to direct the thermal energy released by the at least one of the first cell and the second cell to the heat sink.

3. The energy storage system of claim 2, further comprising a cold plate extending adjacent at least one of the first cell and the second cell, wherein the second thermal interface member is configured to couple the heat sink to the cold plate and operate as a thermal interface therebetween.

4. The energy storage system of claim 2, wherein at least one of the first polymer foam pad and the second polymer foam pad is electrically conductive, the respective at least one of the first thermal interface member and second thermal interface member additionally includes an electrical isolation layer configured to limit loss of electrical energy from the energy storage cell pack.

5. The energy storage system of claim 4, wherein the electrical isolation layer is configured as a polyethylene terephthalate (PET) film.

6. The energy storage system of claim 2, wherein at least one of the first polymer foam pad and the second polymer foam pad is electrically nonconductive, and is characterized by absence of an electrical isolation member at the respective first polymer foam pad and the second polymer foam pad.

7. The energy storage system of claim 2, wherein the anisotropic, thermally conductive layer is a coating or a film applied directly to the first polymer foam pad, and wherein material of the anisotropic layer is selected from boron nitride, graphite, graphene, aluminum nitride, silicon carbide, aluminum oxide, zinc oxide, metallic powder, and synthetic diamond.

8. The energy storage system of claim 1, wherein each of the first polymer foam pad and the second polymer foam pad has a matrix structure including at least one of anisotropic and isotropic thermally conductive filler material and is characterized by foam material density below 0.5 g/cm$^3$.

9. The energy storage system of claim 8, wherein:
the matrix structure has a closed-cell foam construction with one of pre-expanded and heat-activated expanding foaming agent microcapsules; and
the closed-cell matrix structure includes expanded graphite and foamed two-part silicone.

10. The energy storage system of claim 8, wherein the matrix structure has an open-cell foam construction.

11. The energy storage system of claim 8, wherein the matrix structure includes at least one of thermosetting polyurethane, thermoplastic polyurethane, polyvinylester, polystyrene, boron nitride, and graphene.

12. A vehicle comprising:
a powerplant employing electrical energy to generate torque; and
an energy storage system in electric communication with the powerplant, comprising:
an energy storage cell pack including a first cell and a second cell disposed adjacent the first cell, wherein each of the first and second cells is configured to generate and store the electrical energy through thermal energy releasing electro-chemical reactions;
a heat sink arranged perpendicular to each of the first and second cells and configured to accept and dissipate the thermal energy produced by the first and second cells;
a first thermal interface member arranged perpendicular to the heat sink, disposed between the first cell and the second cell, having a first thermally conductive, cure-in-place, polymer foam pad, and configured to:
maintain uniform contact with the first cell and the second cell during alternate expansion of the first and second cells when charging and contraction of the first and second cells when discharging; and
absorb the thermal energy released by the first and second cells and direct the thermal energy to the heat sink; and
a second thermal interface member having a second thermally conductive, cure-in-place, polymer foam pad disposed orthogonal to the first polymer foam pad between the heat sink and the energy storage cell pack, and configured to couple the heat sink to the first polymer foam pad and operate as a thermal interface therebetween; and
wherein:
material characteristics and arrangement of the first polymer foam pad establish direction of thermal conductivity of the first polymer foam pad to limit propagation of the thermal energy between the first cell and the second cell, via the first thermal interface member, and facilitate transfer of waste heat from the energy storage cell pack to the heat sink; and
material characteristics and arrangement of the second polymer foam pad establish direction of thermal conductivity of the second polymer foam pad for effective dissipation of thermal energy, via the second thermal interface member, from the first thermal interface member to the heat sink.

13. The vehicle of claim 12, wherein the first thermal interface member includes an anisotropic, thermally conductive layer disposed between the first polymer foam pad and at least one of the first cell and the second cell, and configured to direct the thermal energy released by the at least one of the first cell and the second cell to the heat sink.

14. The vehicle of claim 13, wherein the anisotropic, thermally conductive layer is a coating or a film applied directly to the first polymer foam pad, and wherein material of the anisotropic layer is selected from boron nitride, graphite, graphene, aluminum nitride, silicon carbide, aluminum oxide, zinc oxide, metallic powder, and synthetic diamond.

15. The vehicle of claim 12, wherein each of the first polymer foam pad and the second polymer foam pad has a matrix structure including at least one of anisotropic and isotropic thermally conductive anisotropic filler material and is characterized by foam material density below 0.5 g/cm$^3$.

16. The energy storage system of claim 15, wherein:
the matrix structure has a closed-cell foam construction with one of pre-expanded and heat-activated expanding foaming agent microcapsules; and
the closed-cell matrix structure includes expanded graphite and foamed two-part silicone.

17. The energy storage system of claim 15, wherein the matrix structure has an open-cell foam construction.

18. The energy storage system of claim 15, wherein the matrix structure includes at least one of thermosetting polyurethane, thermoplastic polyurethane, polyvinylester, polystyrene, boron nitride, and graphene.

19. The vehicle of claim 12, wherein the energy storage system additionally includes a cold plate extending adjacent at least one of the first cell and the second cell, wherein the second thermal interface member is configured to couple the heat sink to the cold plate and operate as a thermal interface therebetween.

20. The vehicle of claim 12, wherein at least one of the first polymer foam pad and the second polymer foam pad is electrically conductive, the respective at least one of the first thermal interface member and second thermal interface member additionally includes an electrical isolation layer configured to limit loss of electrical energy from the energy storage cell pack.

21. The vehicle of claim 12, wherein at least one of the first polymer foam pad and the second polymer foam pad is electrically nonconductive, and is characterized by absence of an electrical isolation member at the respective first polymer foam pad and the second polymer foam pad.

* * * * *